United States Patent
Liu et al.

(10) Patent No.: US 9,972,981 B2
(45) Date of Patent: May 15, 2018

(54) DEVICE FOR SERVICING LIVE POWER LINES

(71) Applicants: HUNAN ELECTRIC POWER CORPORATION, Changsha (CN); THE LIVE WORKING CENTER OF HUNAN ELECTRIC POWER CORPORATION, Changsha (CN); STATE GRID CORPORATION OF CHINA, Beijing (CN)

(72) Inventors: Xiaqing Liu, Changsha (CN); Dehua Zou, Changsha (CN); Yu Yan, Changsha (CN); Wen Li, Changsha (CN); Naicheng Ou, Changsha (CN); Jianjun Zhang, Changsha (CN); Liuxin Wu, Changsha (CN); Hui Li, Changsha (CN); Yang Long, Changsha (CN)

(73) Assignees: Hunan Electric Power Corporation, Changsha (CN); The Live Working Center of Hunan Electric Power Corporation, Changsha (CN); State Grid Corporation of China, Beijing (CN)

(*) Notice: Subject to any disclaimer, the term of this patent is extended or adjusted under 35 U.S.C. 154(b) by 325 days.

(21) Appl. No.: 14/979,630

(22) Filed: Dec. 28, 2015

(65) Prior Publication Data
US 2016/0111860 A1    Apr. 21, 2016

Related U.S. Application Data

(63) Continuation-in-part of application No. PCT/CN2015/079145, filed on May 18, 2015.

(30) Foreign Application Priority Data

May 27, 2014    (CN) .......................... 2014 1 0226160

(51) Int. Cl.
| H02G 1/02 | (2006.01) |
| B25J 5/00 | (2006.01) |
| B25J 11/00 | (2006.01) |

(52) U.S. Cl.
CPC .................. *H02G 1/02* (2013.01); *B25J 5/00* (2013.01); *B25J 11/00* (2013.01)

(58) Field of Classification Search
CPC ....... B25J 5/00; B25J 5/02; B25J 13/00; B25J 13/08; B25J 11/00; H02G 1/02
See application file for complete search history.

(56) References Cited

FOREIGN PATENT DOCUMENTS

CN    100502181 C  *  6/2009

\* cited by examiner

*Primary Examiner* — Carl Arbes
(74) *Attorney, Agent, or Firm* — Matthias Scholl P.C.; Matthias Scholl

(57) ABSTRACT

A device for servicing live power lines, including: a main body, two primary mechanical arms, two telescopic arms, a terminal device, an auxiliary mechanical arm, and a monitoring system. A travelling wheel mechanism, an equipotential wheel, and a first clamping jaw are disposed on the upper end of each telescopic arm. The two primary mechanical arms are symmetrically disposed on two sides of the main body, respectively. The two telescopic arms are vertically disposed on two ends of the main body, respectively, and are capable of telescoping upward and downward. The auxiliary mechanical arm is disposed and adapted to move transversely on the main body. The main body is driven by the travelling wheel mechanism to travel on the high voltage transmission line. The first clamping jaw clamps the high voltage transmission line for locating the main body.

14 Claims, 6 Drawing Sheets

DEVICE FOR SERVICING LIVE POWER LINES

CROSS-REFERENCE TO RELATED APPLICATIONS

This application is a continuation-in-part of International Patent Application No. PCT/CN2015/079145 with an international filing date of May 18, 2015, designating the United States, now pending, and further claims priority benefits to Chinese Patent Application No. 201410226160.8 filed May 27, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a device for servicing live power lines.

Description of the Related Art

A typical device for servicing high voltage transmission line is adapted to inspect power lines but not in live power conditions. The live line work on the high voltage transmission line, such as replacement of an insulator stirring and a torsional damper, and fastening of a bolt of a strain clamp, requires handling by skilled technicians, which is expensive and poses risks.

SUMMARY OF THE INVENTION

In view of the above-described problems, it is one objective of the invention to provide a device that is adapted to travel on live high voltage transmission line, freely surmount obstacles, replace an insulator stirring and a torsional damper, and fasten a bolt of a strain clamp.

To achieve the above objective, in accordance with one embodiment of the invention, there is provided a device for servicing live power lines. The device comprises: a main body, two primary mechanical arms having five degrees of freedom, two telescopic arms, a terminal device, an auxiliary mechanical arm having six degrees of freedom, a monitoring system. A travelling wheel mechanism, an equipotential wheel, and a first clamping jaw for clamping a high voltage transmission line are disposed on an upper end of each telescopic arm. The terminal device comprises: an insert-pull device for inserting in or pulling out a W-shaped pin, a manipulator for holding a steel cap of an insulator, an electric wrench for fastening a nut, and a socket wrench for seizing a head of a bolt whereby fixing the blot. The second clamping jaw is disposed at an end of the auxiliary mechanical arm for clamping the high voltage transmission line or the steel cap of the insulator. The two primary mechanical arms are symmetrically disposed on two sides of the main body, respectively. The two telescopic arms are disposed on two ends of the main body, respectively, and are capable of telescoping upward and downward. The insert-pull device and the manipulator in pairs or the electric wrench and the socket wrench in pairs are detachably disposed on ends of the two primary mechanical arms, respectively. The auxiliary mechanical arm is disposed on the main body and is adapted to move transversely on the main body. The main body is driven by the travelling wheel mechanism to travel on the high voltage transmission line, the equipotential wheel contacts the high voltage transmission line, and the first clamping jaw clamps the high voltage transmission line for locating the main body. The monitoring system is disposed on the main body and controls movements of the primary mechanical arms, the telescopic arms, the terminal device, the auxiliary mechanical arm, a second clamping jaw, the travelling wheel mechanism, the equipotential wheel, and the first clamping jaw.

In a class of this embodiment, to make the structure of the invention much simpler and reasonable, each primary mechanical arm comprises: a transversely movable joint, a telescopic joint, and a longitudinally movable joint. The transversely movable joint is disposed on one side of the main body and is adapted to move transversely on the main body. One end of the telescopic joint is disposed on one end of the transversely movable joint and is 360° rotatable in a vertical plane parallel to the transversely movable joint via a pitch joint. The telescopic joint is 360° rotatable around a telescopic direction thereof via a revolute joint. The longitudinally movable joint is vertically disposed on the other end of the telescopic joint. The terminal device is disposed on an end of the longitudinally movable joint. The monitoring system controls each joint to cooperate to drive the terminal device to a designated position.

In a class of this embodiment, to prevent a socket clevis eye from falling down and to make the structure much simpler, the insert-pull device comprises an upper clamp and a lower clamp which are parallel to each other. The upper clamp is disposed on the lower clamp and is horizontally movable in backward and forward directions. The lower clamp is detachably disposed on an end of the longitudinally movable joint. The monitoring system controls the lower clamp to hold a socket clevis eye and controls the upper clamp to move forward and backward to clamp the W-shaped pin and insert the W-shaped pin into the socket clevis eye or pull the W-shaped pin out of the socket clevis eye.

In a class of this embodiment, to make the structure much simpler, the auxiliary mechanical arm comprises: a transverse support, a first rotating support, a first connecting arm, a second connecting arm, a third connecting arm, and a second rotating support. The transverse support is disposed on the main body and is adapted to move transversely on the main body. The first rotating support is horizontally disposed on the transverse support and is 360° rotatable around a vertical center of the transverse support. One end of the first connecting arm is disposed on the first rotating support and is 180° rotatable in a vertical plane parallel to the transverse support via a first pitch joint. One end of the second connecting arm is disposed on the other end of the first connecting arm and is 180° rotatable in the vertical plane parallel to the transverse support via a second pitch joint. One end of the third connecting arm is disposed on the other end of the second connecting arm and is 180° rotatable in the vertical plane parallel to the transverse support via a third pitch joint. The second rotating support is disposed on the third connecting arm and is 360° rotatable around an axis of the third connecting arm. The second clamping jaw is disposed on the second rotating support. The monitoring system controls the supports and the joints to cooperate to drive the second clamping jaw to a designated position. The monitoring system controls the second clamping jaw to clamp the transmission line.

In a class of this embodiment, a flexible cushion pad is disposed at a joint between the socket wrench and the head of the bolt.

Advantages of the device for servicing live power lines according to embodiments of the invention are summarized as follows:

1. The main body of the device is driven by the travelling wheel mechanism on the telescopic arm to travel on the high voltage transmission line, so that the device has a wide application scope and convenient installation and maintenance.

2. The arrangement of the equipotential wheel ensures that the potentials of the main body and the high voltage transmission line are maintained at the same level, thereby preventing the device from being damaged, and ensuring the hot-line work capability of the device.

3. The terminal device is carried to a working region by the primary mechanical arm having five degrees of freedom. Different terminal devices are mounted on the ends of different primary mechanical arms to perform different live line work, including replacement of the insulator on the high voltage transmission line, and fastening the bolt of a strain clamp.

4. Under the cooperation of the auxiliary mechanical arm having six degrees of freedom, the second clamping jaw on the end of the auxiliary mechanical arm is carried to the working region to clamp the steel cap of the insulator, which is favorable to assisting the technicians to load the device on the transmission line. When the forward movement is obstructed, the second clamping jaw is driven to clamp the high voltage transmission line, the telescopic arm on the front end of the main body is extended out to lift the travelling wheel mechanism of the upper end thereof, and the auxiliary mechanical arm is driven to move relative to the main body so as to allow the telescopic arm and the travelling wheel mechanism of the front end to surmount the obstacle. The above operations are repeated until the telescopic arm and the travelling wheel mechanism of the rear end of the main body surmount the obstacle, so that the device of the invention can continue moving on the high voltage transmission line.

5. The device of the invention has simple structure and high reliability. Technicians are not required to contact the high voltage transmission line during the live line work, thereby improving the safety.

BRIEF DESCRIPTION OF THE DRAWINGS

The invention is described hereinbelow with reference to the accompanying drawings, in which.

DETAILED DESCRIPTION OF THE EMBODIMENTS

Figure 1:
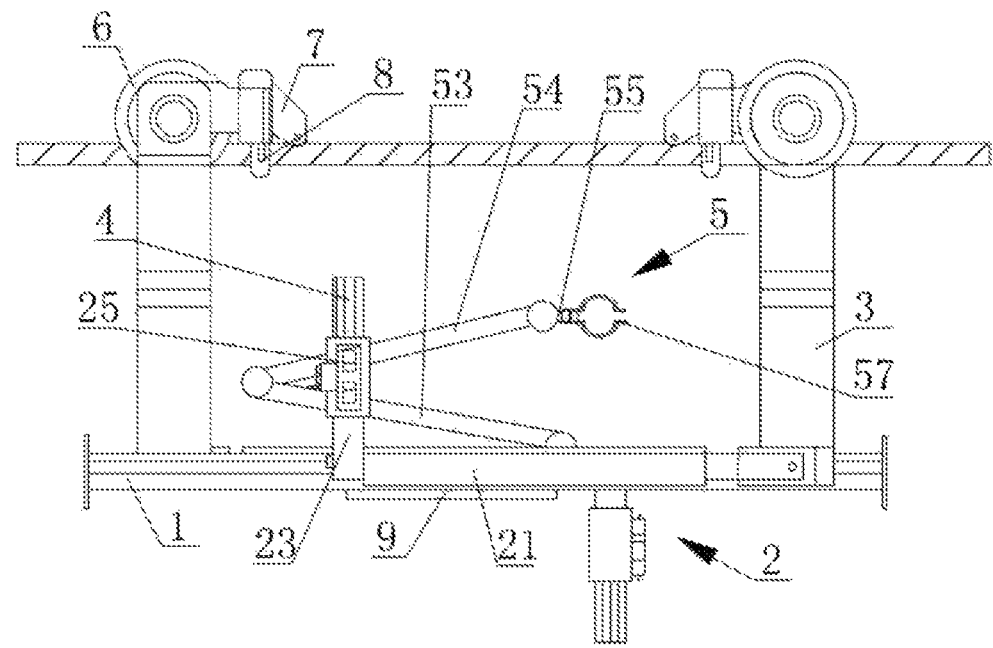
FIG. 1 is a structure diagram of a device for servicing live power lines according to one embodiment of the invention.
Figure 2:
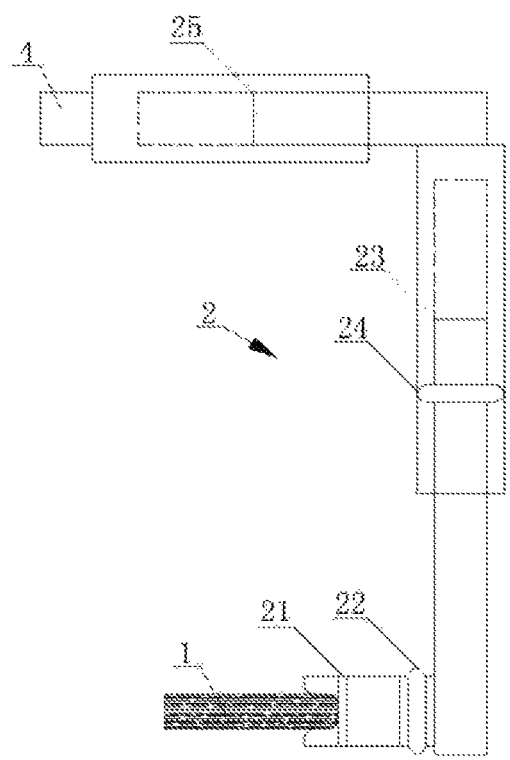
FIG. 2 is a structure diagram of a primary mechanical arm according to one embodiment of the invention.
Figure 3:
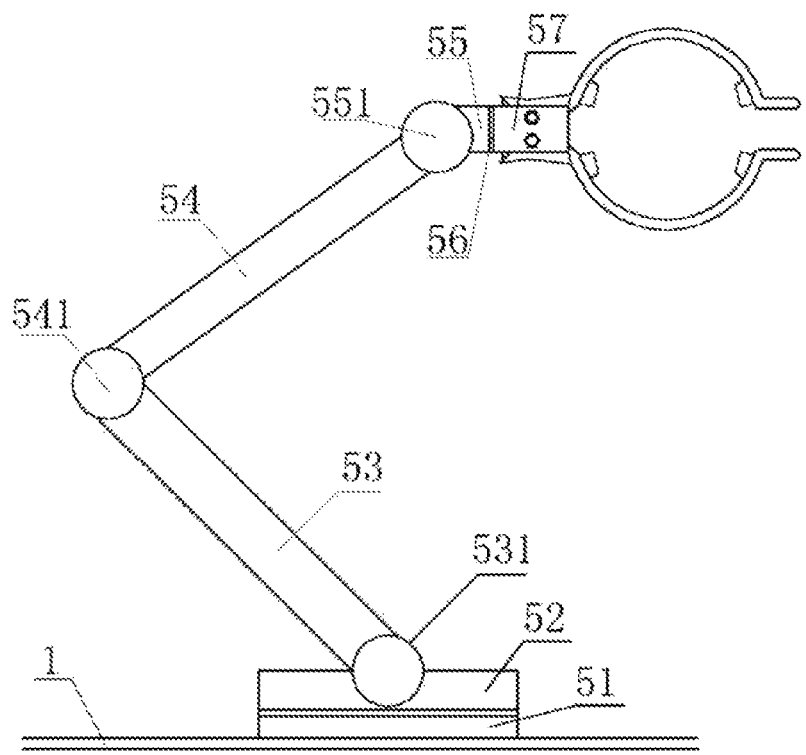
FIG. 3 is a structure diagram of an auxiliary mechanical arm according to one embodiment of the invention.
Figure 4:
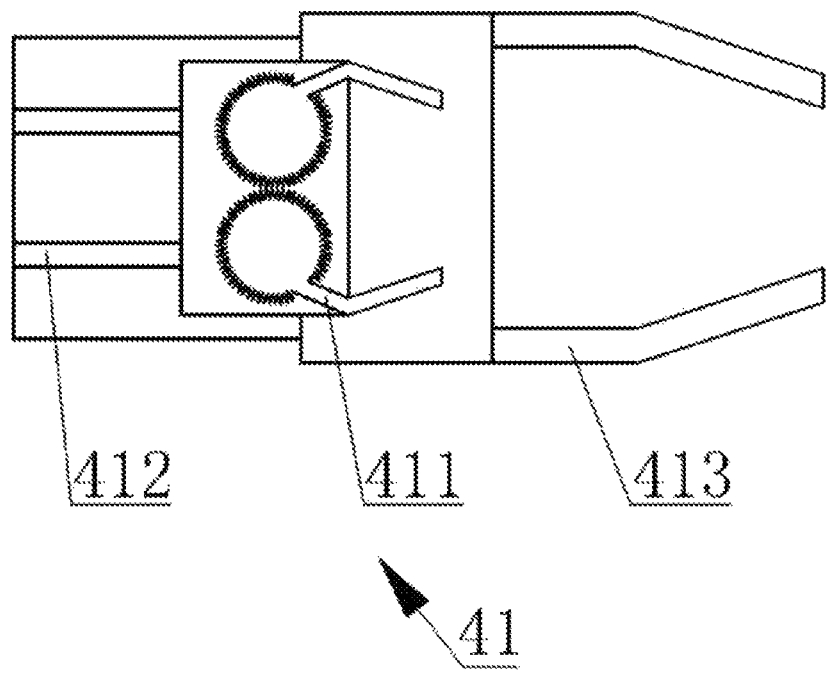
FIG. 4 is a structure diagram of an insert-pull device for inserting in or pulling out a W-shaped pin according to one embodiment of the invention.
Figure 5:
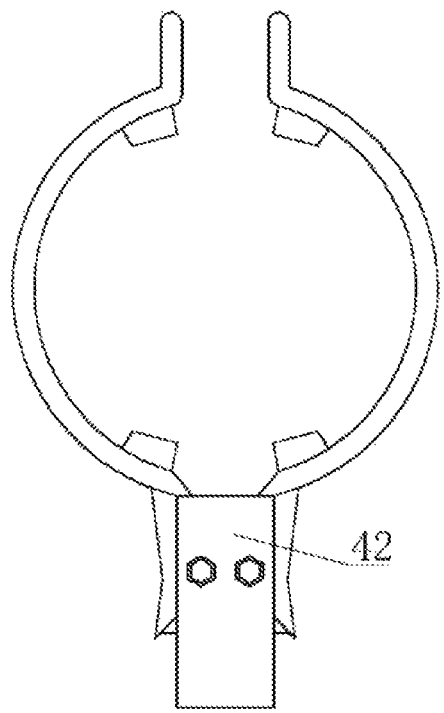
FIG. 5 is a structure diagram of an auxiliary mechanical arm according to one embodiment of the invention.
Figure 6:
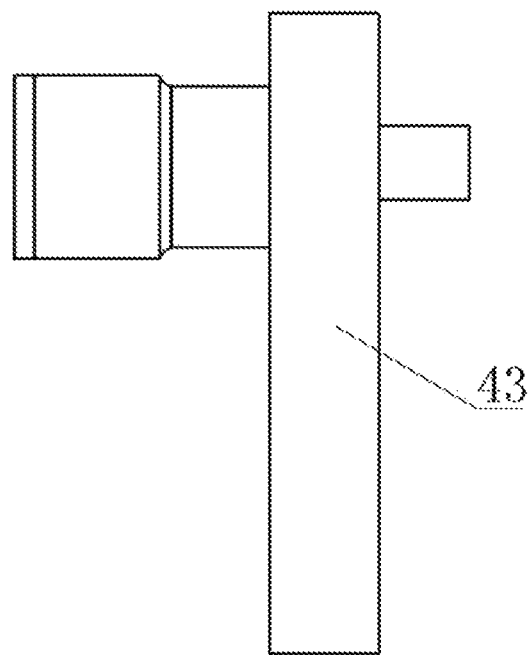
FIG. 6 is a structure diagram of an electric wrench according to one embodiment of the invention.
Figure 7:
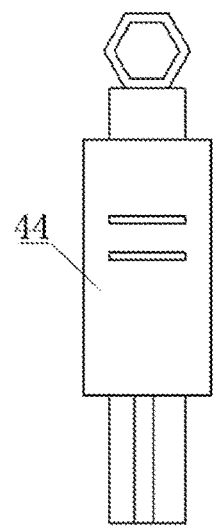
FIG. 7 is a structure diagram of a socket wrench according to one embodiment of the invention.

For further illustrating the invention, experiments detailing a device for servicing live power lines are described below. It should be noted that the following examples are intended to describe and not to limit the invention.

As shown in FIGS. 1-7, a device for servicing high voltage transmission line comprises: a main body 1, two primary mechanical arms 2 having five degrees of freedom symmetrically disposed on two sides of the main body 1, two telescopic arms 3, a terminal device 4, an auxiliary mechanical arm 5 having six degrees of freedom, a monitoring system 9 installed on the main body 1. A travelling wheel mechanism 6, an equipotential wheel 7, and a first clamping jaw 8 for clamping a high voltage transmission line are disposed on an upper end of each telescopic arm 3. Each primary mechanical arm 2 comprises: a transversely movable joint 21, a pitch joint 22, a telescopic joint 23, and a longitudinally movable joint 25. The terminal device 4 comprises: an insert-pull device 41 for inserting in or pulling out a W-shaped pin, a manipulator 42 for holding a steel cap of an insulator, an electric wrench 43 for fastening a nut, and a socket wrench 44 for seizing a head of a bolt whereby fixing the blot. The auxiliary mechanical arm 5 comprises: a transverse support 51, a first rotating support 52, a first connecting arm 53, a second connecting arm 54, a third connecting arm 55, a second rotating support 56, and a second clamping jaw 57 for clamping the high voltage transmission line or the steel cap of the insulator.

The transversely movable joint 21 is mounted on one side of the main body 1 and is controlled by the monitoring system 9 to transversely move along the main body 1. One end of the telescopic joint 23 is disposed on one end of the transversely movable joint 21 via a pitch joint 22. The monitoring system 9 controls the pitch joint 22 to drive the telescopic joint 23 to rotate for 360° in a vertical plane parallel to the transversely movable joint 21. The monitoring system 9 controls the telescopic joint 23 to extend or retract in an axis direction thereof and controls the revolute joint 24 to drive the telescopic joint 23 to revolve for 360° around a telescopic direction. The longitudinally movable joint 25 is vertically disposed on the other end of the telescopic joint 23. The monitoring system 9 controls the longitudinal movable joint 25 to move in a direction perpendicular to the telescopic joint 23.

The two telescopic arms 3 are vertically disposed on two ends of the main body 1 and controlled by the monitoring system 9 to extend or retract in the vertical direction. The insert-pull device 41 and the manipulator 42 in pairs or the electric wrench 43 and the socket wrench 44 in pairs are detachably disposed on ends of the longitudinal movable joints 25 of the two primary mechanical arms 2, respectively. The insert-pull device 41 comprises an upper clamp 411 and a lower clamp 413 which are parallel to each other. The upper clamp 411 is disposed on the lower clamp 413 and is horizontally movable in backward and forward directions via a horizontally movable joint 412. The lower clamp 413 is detachably disposed on an end of the longitudinally movable joint 25. The monitoring system 9 controls the lower clamp 413 to hold a socket clevis eye and controls the horizontally movable joint 412 to drive the upper clamp 411 to move forward and backward to clamp the W-shaped pin and insert the W-shaped pin into the socket clevis eye or pull the W-shaped pin out of the socket clevis eye. The manipulator 42 is mounted on the end of the longitudinal movable joint 25 and is forward and backward movable horizontally via a forward-backward movable joint 421.

The transverse support 51 is disposed on the main body 1 and controlled by the monitoring system 9 to move transversely on the main body 1. The first rotating support 52 is horizontally disposed on the transverse support 51 and is 360° rotatable around a vertical center of the transverse support 51 under the control of the monitoring system. One end of the first connecting arm 53 is disposed on the first rotating support 52 via a first pitch joint 531 and the monitoring system 9 controls the first connecting arm 53 to drive the first connecting arm 53 to rotate for 180° in a vertical plane parallel to the transverse support 51. One end of the second connecting arm 54 is disposed on the other end of the first connecting arm 53 via a second pitch joint 541 and the monitoring system 9 controls the second pitch joint 541 to drive the second connecting arm 54 to rotate for 180° in the vertical plane parallel to the transverse support 51. One end of the third connecting arm 55 is disposed on the other end of the second connecting arm 54 via a third pitch joint 551 and the monitoring system 9 controls the third pitch joint 551 to drive the third connecting arm 55 to rotate for 180° in the vertical plane parallel to the transverse support 51. The second rotating support 56 is disposed on the third connecting arm 55 and is 360° rotatable around an axis of the third connecting arm 55 under the control of the monitoring system 9. The second clamping jaw 57 is disposed on the second rotating support 56 and is controlled by the monitoring system 9 to clamp the high voltage transmission line or the steel cap of the insulator. The monitoring system 9 controls the travelling wheel mechanism 6 to travel on the high voltage transmission line. The equipotential wheel 7 contacts the high voltage transmission line to ensure that the device of the invention keep at the same potential as the transmission line. The monitoring system 9 drives the first clamping jaw 8 to clamp the high voltage transmission line for locating the main body 1.

The monitoring system 9 of the device comprises: an on-board controller, a driver, a camera, a sensor, a communication device, and a power module. Different parts of the device communicate with a ground base station. The ground base station sends an order to control the movement of each part, states of each joint and the sensor are returned to the ground base station, and the camera sends video images to the ground base station via the communication device. The video images are collected by the camera and processed manually or by an image processing program so as to locate the operating target of the device. The power module supplies power for each part of the device.

Process of loading the device on the transmission line is as follows:

1. Technicians adopt an insulating rod to carry the device of the invention to a position beneath the high voltage transmission line.

2. An order is sent from the ground base station to the monitoring system 9 of the device, and the supports and the joints of the auxiliary mechanical arm 5 are controlled by the monitoring system 9 to cooperate and drive the second clamping jaw 57 to a working region.

3. The second clamping jaw 57 clamps the high voltage transmission line under the control of the monitoring system 9.

4. The ground base station controls the monitoring system 9 according to the position of the device to regulate the movements of the supports and the joints of the auxiliary mechanical arm 5 and drive the telescopic arms 3 to extend out, so that the travelling wheel mechanism 6, the equipotential wheel 7, and the first clamping jaw 8 are correctly locked on the high voltage transmission line.

5. The stress exerted on the auxiliary mechanical arm 5 is gradually transferred to the travelling wheel mechanisms 6. When it is identified that the travelling wheel mechanisms 6 are well stressed, the monitoring system 9 controls the second clamping jaws 57 to release the high voltage transmission line and controls the supports and the joints to return to the original positions, respectively. The technicians then remove the insulating rod from the device. Thus, the device is loaded on the transmission line.

A process for the device to replace the insulator during live line work is as follows:

1. The insert-pull device 41 and the manipulator 42 are mounted on the ends of the longitudinally movable joints 25 of the two primary mechanical arms 2, respectively, and the technicians operate the device to load on the transmission line.

2. The ground base station sends an order to the monitoring system 9, and the monitoring system 9 drives the travelling wheel mechanisms 6 so that the device moves to the vicinity of the insulator to be replaced and identify a position of a suspension clamp, so that the device is ensured to be located relative to the suspension clamp.

3. It is identified whether the device reaches the working region according to the images returned by the camera. When the device reaches the working region, the ground base station sends out an anchoring order. The monitoring system 9 drives the travelling wheel mechanism 6 to stop when receiving the order and controls the first clamping jaw 8 to clamp the high voltage transmission line, thereby locking the device thereon.

Figure 8:
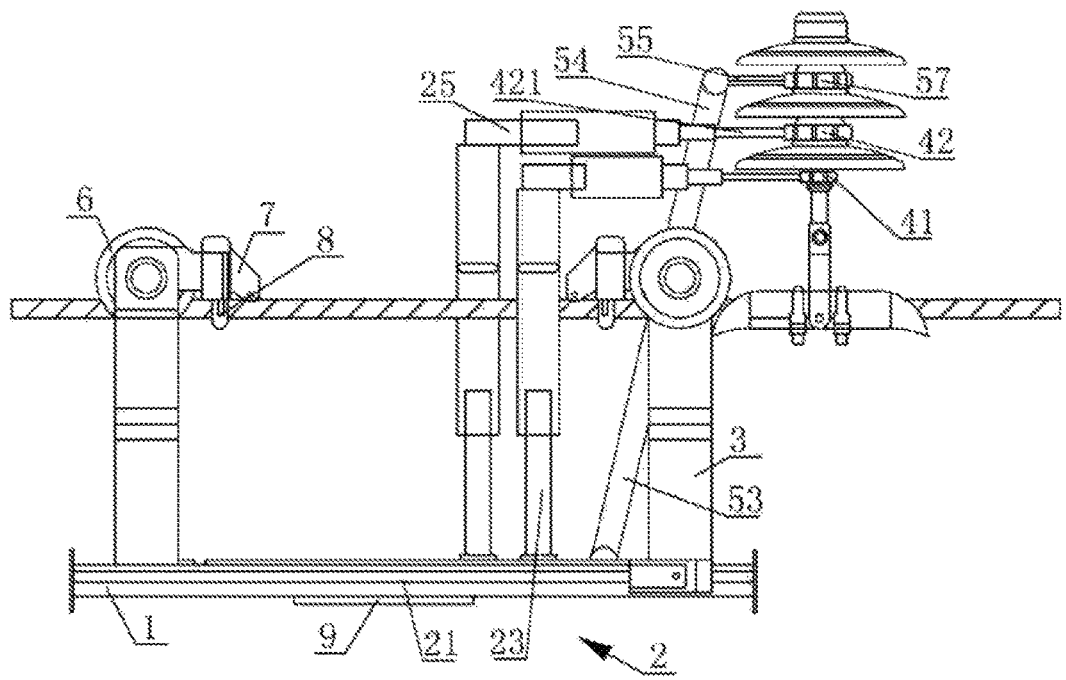
FIG. 8 is a structure diagram showing that a device for servicing live power lines is replacing an insulator according to one embodiment of the invention.

4. The ground base station starts to control the operation of the primary mechanical arms 2, so that the five joints of each primary mechanical arm 2 cooperate, and the insert-pull device 41 and the manipulator 42 are carried to the work face under the monitor of the ground base station, as shown in FIG. 8.

5. Because the accommodating position of the W-shaped pin is fixed relative to the socket clevis eye and the socket clevis eye must be maintained at a static state when pulling out the W-shaped pin, when the insert-pull device 41 is located relative to the socket clevis eye, the monitoring system 9 controls the lower clamp 413 to hold the socket clevis eye thereby fixing the position thereof. The monitoring system 9 then controls the upper clamp 411 to hold the W-shaped pin and controls the horizontally movable joint 412 to drive the upper clamp 411 to move backward to pull the W-shaped pin out of the socket clevis eye.

6. In the meanwhile, the monitoring system 9 controls the manipulator 42 on the other primary mechanical arm 2 to seize the steel cap of the insulator for preventing an insulator stirring from shaking After the W-shaped pin is pulled out, the monitoring system 9 controls the movement of the forward-backward movable joint 421 so as to drive the manipulator 42 to hold and push out the insulator stirring. During the above process, the monitoring system 9 controls the auxiliary mechanical arm 5 to seize an upper end of the insulator stirring and lift the insulator stirring after being pushed out. Then, the technician takes down the insulator stirring.

7. After the insulator stirring is replaced, a new insulator stirring is mounted in the socket clevis eye according to the reverse process flow. In the whole process from pulling out of the W-shaped pin to inserting in the W-shaped pin, the socket clevis eye is always clamped by the lower clamp 413 of the insert-pull device 41. After the replacement of the insulator stirring, the W-shaped pin is inserted into the socket clevis eye according to the reverse process flow.

8. When the replacement of the insulator is accomplished, the monitoring system 9 controls the manipulator 42 to release the insulator stirring, and the upper clamp and the lower clamp of the insert-pull device 41 are loosen from the socket clevis eye and the W-shaped pin and are returned to the original position along with the primary mechanical arm 2.

9. When it is determined that the new insulator stirring is well stressed, the monitoring system 9 controls the auxiliary mechanical arm 5 to open the second clamping jaw 57 and to return to the original position thereof.

A process for the device to fasten a bolt of a strain clamp during live line work is as follows:

1. The electric wrench 43 and the socket wrench 44 are mounted on the ends of the longitudinally movable joints 25 of the primary mechanical arms, respectively. The technicians operate the device to load on the transmission line.

2. The ground base station sends out a traveling order, and the monitoring system 9 drives the travelling wheel mechanism 6 when receiving the order, so that the device moves to the vicinity of the strain clamp needs to fasten the bolt. When the device reaches the working region, the ground base station sends out an anchoring order. The monitoring system 9 drives the travelling wheel mechanism 6 to stop when receiving the order and controls the first clamping jaw 8 to clamp the high voltage transmission line, thereby locking the device thereon.

Figure 9:
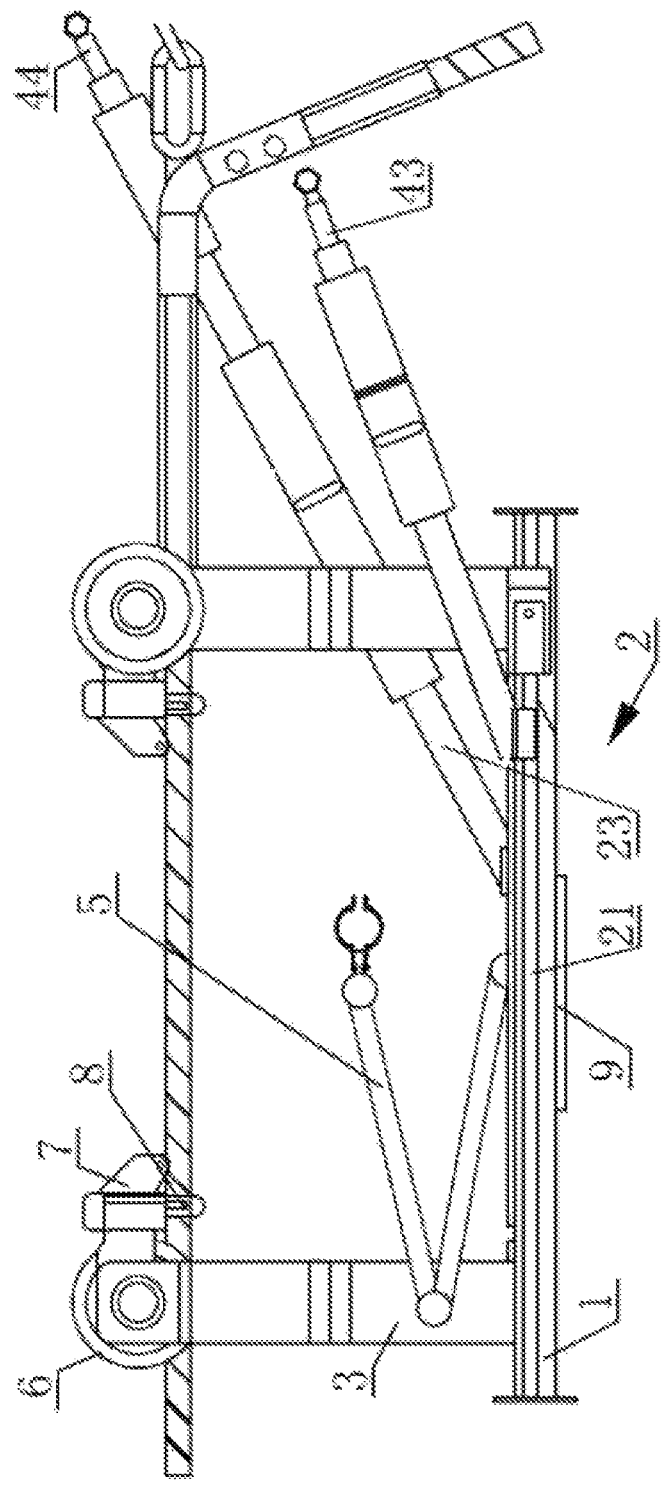
FIG. 9 is a structure diagram showing that a device for servicing live power lines is fastening a bolt of a strain clamp according to one embodiment of the invention.

3. The ground base station starts to control the operation of the primary mechanical arms 2, so that the five joints of each primary mechanical arm 2 cooperate, and the electric wrench 43 and the socket wrench 44 are carried to the work face under the monitor of the ground base station, as shown in FIG. 9. During the process, the primary mechanical arms 2 are prevented from contacting each other or contacting other parts of the device.

4. After the primary mechanical arm 2 carrying the socket wrench 44 reaches the work face, the monitoring system 9 drive the five joints of the primary mechanical arm 2 to cooperate for fine motion, so that a head of a bolt is nested within a socket of the socket wrench 44, then the socket wrench 44 is rotated to lock the head of the bolt, thereby preventing the blot from moving or rotating.

5. When the primary mechanical arm 2 carrying the electric wrench 43 reaches the work face, the monitoring system 9 drive the five joints of the primary mechanical arm 2 to cooperate for fine motion, so that a nut is nested within a nut socket of the electric wrench 43, then the monitoring system 9 controls a motor of the electric wrench 43 to rotate the nut socket, thereby fastening the nut.

Taken a torsional damper as an example, a process for the device of the invention to surmount an obstacle is as follows:

1. The device reaches the torsional damper. The ground base station sends a signal to the monitoring system 9 of the device when the obstacle is identified, the monitoring system 9 controls each support and joint of the auxiliary mechanical arm 5 to cooperate and drives the second clamping jaw 57 to move to the high voltage transmission line in the vicinity of a front travelling wheel mechanism 6 in the proceeding direction of the device.

2. The monitoring system 9 controls the second clamping jaw 57 of the auxiliary mechanical arm 5 to clamp the high voltage transmission line in the vicinity of the front traveling wheel mechanism 6.

Figure 10:
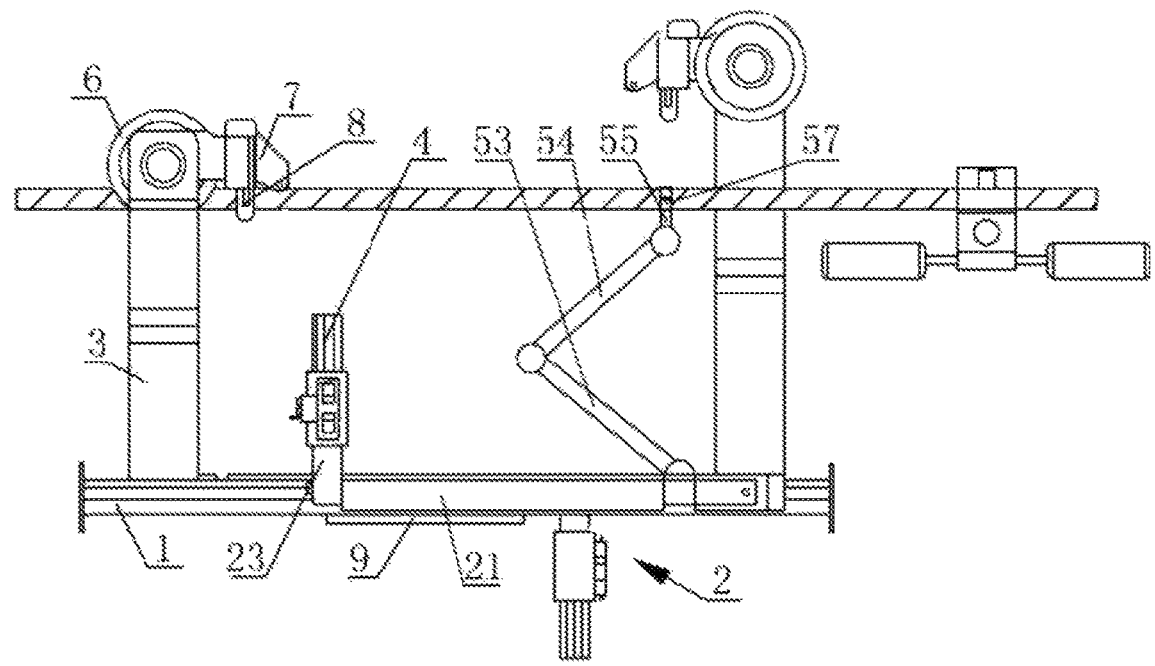
FIG. 10 is a structure diagram showing a first step of a device for servicing live power lines to surmount an obstacle.

3. The monitoring system 9 controls the telescopic arm 3 of the front travelling wheel mechanism 6 to extend upward, so that the stress on the front travelling wheel mechanism 6 is transferred to the auxiliary mechanical arm 5. Then the front travelling wheel mechanism 6 departs from the high voltage transmission line, as shown in FIG. 10.

4. When a height of the front travelling wheel mechanism 6 is enough to surmount the obstacle, the monitoring system 9 controls the telescopic arm 3 to stop extending.

5. When it is identified by the monitoring system 9 that the auxiliary mechanical arm 5 is well stressed, the rear travelling wheel mechanism 6 is controlled to drive the device to continue to move forward. During the proceeding, the monitoring system 9 flexibly regulates positions of the supports and the joints of the auxiliary mechanical arm 5, thus keeping the second clamping jaw 57 of the auxiliary mechanical arm 5 static relative to the transmission line and providing a stable supporting force.

6. After the front travelling wheel mechanism 6 surmounts the obstacle, the monitoring system 9 controls the telescopic arm 3 to retract the front travelling wheel mechanism 6 to the high voltage transmission line for bearing the stress again. When the front travelling wheel mechanism 6 is identified by the monitoring system 9 to be well stressed, the second clamping jaw 57 of the auxiliary mechanical arm 5 is controlled to release the high voltage transmission line, and thus, the obstacle surmounting process of the front travelling wheel mechanism 6 is accomplished.

Figure 11:
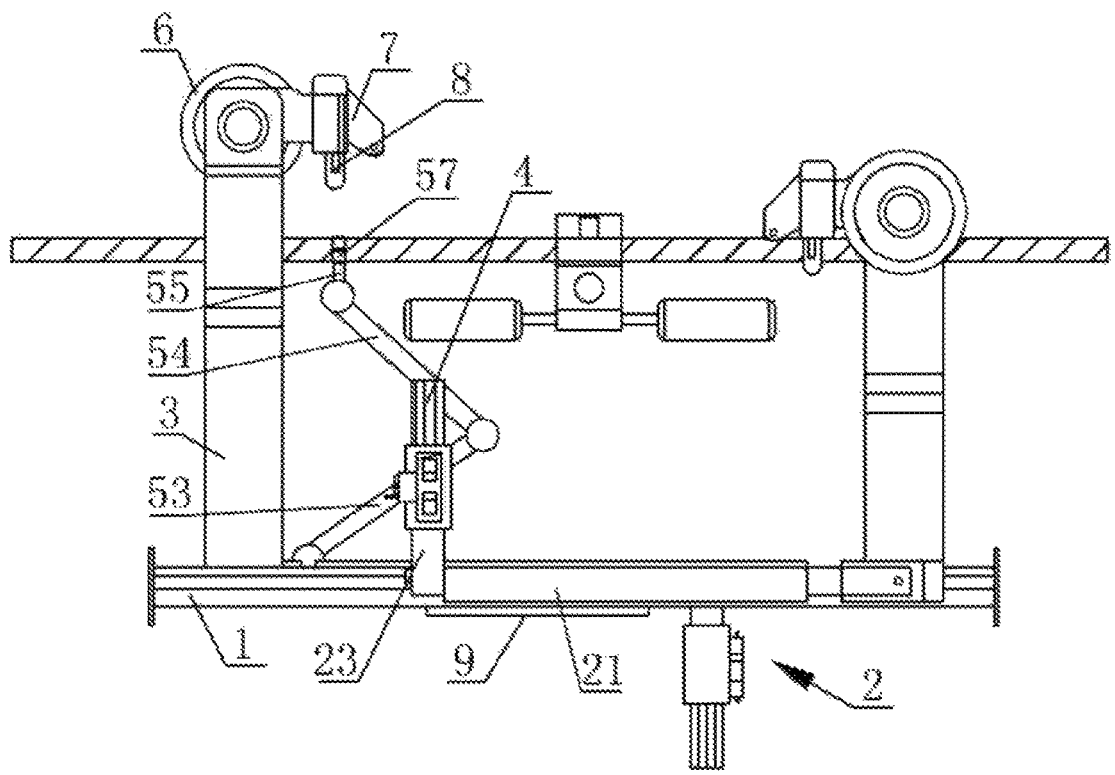
FIG. 11 is a structure diagram showing a second step of a device for servicing live power lines to surmount an obstacle.

7. The above processes are repeated to enable the rear travelling wheel mechanism 6 to continue surmounting the obstacle, as shown in FIG. 11, and when both the front and the rear travelling wheel mechanisms 6 surmount the torsional damper, the auxiliary mechanical arm 5 returns to the original position under the control of the monitoring system 9, thus the obstacle surmounting of the device is accomplished.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for servicing live power lines, the device comprising:
   a) a main body;
   b) two primary mechanical arms, each primary mechanical arm having five degrees of freedom;
   c) two telescopic arms, each telescopic arm comprising an upper end comprising a travelling wheel mechanism, an equipotential wheel, and a first clamping jaw for clamping a high voltage transmission line;
   d) a terminal device;
   e) an auxiliary mechanical arm, the auxiliary mechanical arm having six degrees of freedom and comprising a second clamping jaw; and
   f) a monitoring system;

wherein
   the travelling wheel mechanism, the equipotential wheel, and the first clamping jaw are disposed on the upper end of each telescopic arm;
   the two primary mechanical arms are symmetrically disposed on two sides of the main body, respectively;
   the two telescopic arms are vertically disposed on two ends of the main body, respectively, and are capable of telescoping upward and downward;
   the auxiliary mechanical arm is disposed on the main body and is adapted to move transversely on the main body;
   the main body is driven by the travelling wheel mechanism to travel on the high voltage transmission line, the equipotential wheel contacts the high voltage transmission line, and the first clamping jaw clamps the high voltage transmission line for locating the main body; and
   the monitoring system is disposed on the main body and controls movements of the primary mechanical arms, the telescopic arms, the terminal device, the auxiliary mechanical arm, the second clamping jaw, the travelling wheel mechanism, the equipotential wheel, and the first clamping jaw.

2. The device of claim 1, wherein
   the terminal device comprises: an insert-pull device for inserting in or pulling out a W-shaped pin, a manipulator for holding a steel cap of an insulator, an electric wrench for fastening a nut, and a socket wrench for seizing a head of a bolt whereby fixing the blot; and
   the second clamping jaw is disposed at an end of the auxiliary mechanical arm for clamping the high voltage transmission line or the steel cap of the insulator.

3. The device of claim 2, wherein the insert-pull device and the manipulator in pairs, or the electric wrench and the socket wrench in pairs, are detachably disposed on ends of the two primary mechanical arms, respectively.

4. The device of claim 1, wherein
   each primary mechanical arm comprises: a transversely movable joint, a telescopic joint, and a longitudinally movable joint;
   the transversely movable joint is disposed on one side of the main body and is adapted to move transversely on the main body;
   one end of the telescopic joint is disposed on one end of the transversely movable joint and is 360° rotatable in a vertical plane parallel to the transversely movable joint via a pitch joint;
   the telescopic joint is 360o rotatable around a telescopic direction thereof via a revolute joint; and
   the longitudinally movable joint is vertically disposed on the other end of the telescopic joint.

5. The device of claim 2, wherein
   each primary mechanical arm comprises: a transversely movable joint, a telescopic joint, and a longitudinally movable joint;
   the transversely movable joint is disposed on one side of the main body and is adapted to move transversely on the main body;
   one end of the telescopic joint is disposed on one end of the transversely movable joint and is 360o rotatable in a vertical plane parallel to the transversely movable joint via a pitch joint;
   the telescopic joint is 360o rotatable around a telescopic direction thereof via a revolute joint; and
   the longitudinally movable joint is vertically disposed on the other end of the telescopic joint.

6. The device of claim 3, wherein
   each primary mechanical arm comprises: a transversely movable joint, a telescopic joint, and a longitudinally movable joint;
   the transversely movable joint is disposed on one side of the main body and is adapted to move transversely on the main body;
   one end of the telescopic joint is disposed on one end of the transversely movable joint and is 360o rotatable in a vertical plane parallel to the transversely movable joint via a pitch joint;
   the telescopic joint is 360o rotatable around a telescopic direction thereof via a revolute joint; and
   the longitudinally movable joint is vertically disposed on the other end of the telescopic joint.

7. The device of claim 4, wherein the terminal device is disposed on an end of the longitudinally movable joint; and the monitoring system controls each joint to cooperate to drive the terminal device to a designated position.

8. The device of claim 5, wherein the terminal device is disposed on an end of the longitudinally movable joint; and the monitoring system controls each joint to cooperate to drive the terminal device to a designated position.

9. The device of claim 6, wherein the terminal device is disposed on an end of the longitudinally movable joint; and the monitoring system controls each joint to cooperate to drive the terminal device to a designated position.

10. The device of claim 2, wherein
    the insert-pull device comprises an upper clamp and a lower clamp which are parallel to each other;
    the upper clamp is disposed on the lower clamp and is horizontally movable in backward and forward directions;
    the lower clamp is detachably disposed on an end of the longitudinally movable joint; and
    the monitoring system controls the lower clamp to hold a socket clevis eye and controls the upper clamp to move forward and backward to clamp the W-shaped pin and insert the W-shaped pin into the socket clevis eye or pull the W-shaped pin out of the socket clevis eye.

11. The device of claim 1, wherein
    the auxiliary mechanical arm comprises: a transverse support, a first rotating support, a first connecting arm, a second connecting arm, a third connecting arm, and a second rotating support;
    the transverse support is disposed on the main body and is adapted to move transversely on the main body;
    the first rotating support is horizontally disposed on the transverse support and is 360o rotatable around a vertical center of the transverse support;
    one end of the first connecting arm is disposed on the first rotating support and is 180o rotatable in a vertical plane parallel to the transverse support via a first pitch joint;
    one end of the second connecting arm is disposed on the other end of the first connecting arm and is 180o rotatable in the vertical plane parallel to the transverse support via a second pitch joint;
    one end of the third connecting arm is disposed on the other end of the second connecting arm and is 180o rotatable in the vertical plane parallel to the transverse support via a third pitch joint;
    the second rotating support is disposed on the third connecting arm and is 360o rotatable around an axis of the third connecting arm;
    the second clamping jaw is disposed on the second rotating support;

the monitoring system controls the supports and the joints to cooperate to drive the second clamping jaw to a designated position; and the monitoring system controls the second clamping jaw to clamp the high voltage transmission line.

12. The device of claim 2, wherein the auxiliary mechanical arm comprises: a transverse support, a first rotating support, a first connecting arm, a second connecting arm, a third connecting arm, and a second rotating support;

the transverse support is disposed on the main body and is adapted to move transversely on the main body;

the first rotating support is horizontally disposed on the transverse support and is 360o rotatable around a vertical center of the transverse support;

one end of the first connecting arm is disposed on the first rotating support and is 180o rotatable in a vertical plane parallel to the transverse support via a first pitch joint;

one end of the second connecting arm is disposed on the other end of the first connecting arm and is 180o rotatable in the vertical plane parallel to the transverse support via a second pitch joint;

one end of the third connecting arm is disposed on the other end of the second connecting arm and is 180o rotatable in the vertical plane parallel to the transverse support via a third pitch joint;

the second rotating support is disposed on the third connecting arm and is 360o rotatable around an axis of the third connecting arm;

the second clamping jaw is disposed on the second rotating support;

the monitoring system controls the supports and the joints to cooperate to drive the second clamping jaw to a designated position; and the monitoring system controls the second clamping jaw to clamp the high voltage transmission line.

13. The device of claim 3, wherein the auxiliary mechanical arm comprises: a transverse support, a first rotating support, a first connecting arm, a second connecting arm, a third connecting arm, and a second rotating support;

the transverse support is disposed on the main body and is adapted to move transversely on the main body;

the first rotating support is horizontally disposed on the transverse support and is 360o rotatable around a vertical center of the transverse support;

one end of the first connecting arm is disposed on the first rotating support and is 180o rotatable in a vertical plane parallel to the transverse support via a first pitch joint;

one end of the second connecting arm is disposed on the other end of the first connecting arm and is 180o rotatable in the vertical plane parallel to the transverse support via a second pitch joint;

one end of the third connecting arm is disposed on the other end of the second connecting arm and is 180o rotatable in the vertical plane parallel to the transverse support via a third pitch joint;

the second rotating support is disposed on the third connecting arm and is 360o rotatable around an axis of the third connecting arm;

the second clamping jaw is disposed on the second rotating support;

the monitoring system controls the supports and the joints to cooperate to drive the second clamping jaw to a designated position; and the monitoring system controls the second clamping jaw to clamp the high voltage transmission line.

14. The device of claim 3, wherein a flexible cushion pad is disposed at a joint between the socket wrench and the head of the bolt.

* * * * *